United States Patent
Granshaw et al.

(10) Patent No.: US 9,477,576 B2
(45) Date of Patent: Oct. 25, 2016

(54) USING APPLICATION STATE DATA AND ADDITIONAL CODE TO RESOLVE DEADLOCKS

(71) Applicant: International Business Machines Corporation, Armonk, NY (US)

(72) Inventors: David Granshaw, Winchester (GB); Samuel T. Massey, Southampton (GB); Daniel J. McGinnes, Southampton (GB); Martin A. Ross, Portsmouth (GB); Richard G. Schofield, Eastleigh (GB); Craig H. Stirling, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/860,590

(22) Filed: Apr. 11, 2013

(65) Prior Publication Data

US 2014/0310694 A1 Oct. 16, 2014

(51) Int. Cl.
G06F 9/44 (2006.01)
G06F 11/36 (2006.01)
G06F 11/34 (2006.01)

(52) U.S. Cl.
CPC ........ *G06F 11/3624* (2013.01); *G06F 11/3466* (2013.01); *G06F 11/3688* (2013.01)

(58) Field of Classification Search
CPC ................. G06F 11/3466; G06F 11/3688
USPC ................................................ 717/131
See application file for complete search history.

(56) References Cited

U.S. PATENT DOCUMENTS

| | | | |
|---|---|---|---|
| 7,275,239 B2 | 9/2007 | Cuomo et al. | |
| 8,141,050 B2 | 3/2012 | Farchi et al. | |
| 2004/0024797 A1* | 2/2004 | Berry | G06F 11/3466 707/999.206 |
| 2004/0244011 A1* | 12/2004 | Morris et al. | 719/318 |
| 2005/0028157 A1 | 2/2005 | Betancourt et al. | |
| 2006/0221819 A1* | 10/2006 | Padwekar | 370/229 |
| 2008/0184238 A1* | 7/2008 | Ruemmler | 718/102 |
| 2011/0029966 A1* | 2/2011 | Moshir et al. | 717/173 |
| 2011/0107151 A1 | 5/2011 | Che et al. | |
| 2011/0271284 A1 | 11/2011 | Simonian | |
| 2012/0030657 A1* | 2/2012 | Gao et al. | 717/128 |
| 2014/0250441 A1* | 9/2014 | Tonouchi | G06F 11/3604 718/106 |

OTHER PUBLICATIONS

Agarwal et al., "Detection of deadlock potentials in multithreaded programs", IBM J. Res. & Dev. vol. 54 No. 5 Paper 3 Sep./Oct. 2010, Copyright 2010 IBM.
(Continued)

*Primary Examiner* — Li B Zhen
*Assistant Examiner* — Bradford Wheaton
(74) *Attorney, Agent, or Firm* — Isaac J. Gooshaw (57) ABSTRACT

A computer captures a thread state data of a first program. The computer generates a second program by applying a first program patch to the first program. The computer inserts additional code into a source code of the second program. The computer executes a first performance test using the second program and the inserted additional code. The computer monitors a first status of the second program and the inserted additional code that are under the first performance test. The computer determines a degree that a first deadlock state was prevented during the first performance test. The computer generates a first message based, at least in part, on the determined degree that the first deadlock state was prevented during the first performance test.

15 Claims, 3 Drawing Sheets

(56) References Cited

OTHER PUBLICATIONS

Agarwal et al., "Run-Time Detection of Potential Deadlocks for Programs with Locks, Semaphores, and Condition Variables", PADTAD-IV, Jul. 17, 2006, Portland, Maine, USA, Copyright 2006 ACM 1-59593-263-1/06/0007.

Baur, "Instrumenting Java Bytecode to Replay Execution Traces of Multithreaded Programs", Apr. 10, 2003, pp. 1-15, Formal Methods Group, Computer Systems Institute, Swiss Federal Institute of Technology, Zurich.

Joshi et al., A Randomized Dynamic Program Analysis Technique for Detecting Real Deadlocks, PLDI'09, Jun. 15-20, 2009, Dublin, Ireland, Copyright 2009 ACM 978-1-60558-392-1/09/06.

"Software Technology for Multi-core", Feb. 10, 2010, <http://aminoprj.blogspot.com/2010/02/easily-find-potential-deadlocks-in.html>, printed Jan. 22, 2013.

\* cited by examiner

USING APPLICATION STATE DATA AND ADDITIONAL CODE TO RESOLVE DEADLOCKS

FIELD OF THE INVENTION

The present invention relates generally to the field of program testing, and more particularly to resolving deadlock scenarios.

BACKGROUND OF THE INVENTION

In a multiprocessing computing environment, more than one process may actively use the resources available in the computing environment. To avoid corruption of a resource due to the concurrent use or modification by multiple processes, a process may lock a resource and release the lock after the process has finished using the process.

Deadlock is a well-known problem in many programming environments. In some situations, a deadlock occurs when two processes or two elements (e.g., threads) in a process are each waiting for the other to release a lock, before either one can continue, which generates an infinite loop of waiting for both. Occurrence of a deadlock is often disruptive. Thus, software applications and multiprocessing environments, in which the applications operate, are typically tested to identify the causes of and program code updates needed to prevent deadlock. However, in practice, deadlock is generally difficult to predict or detect. The difficulty in deadlock prediction and detection is typically due to an inherently imperfect knowledge of synchronization within complex multi-threaded environments. Sometimes, acquiring multiple locks in a different order is deadlock-prone, while in other instances the acquisition order does not matter.

SUMMARY

Embodiments of the present invention disclose a method, computer program product, and system for using program state data and additional code to resolve deadlocks. A computer captures a thread state data of a first program. The computer generates a second program by applying a first program patch to the first program. The computer inserts additional code into a source code of the second program. The computer executes a first performance test using the second program and the inserted additional code. The computer monitors a first status of the second program with the inserted additional code that is under the first performance test. The computer determines a degree that a first deadlock state was prevented during the first performance test. The computer generates a first message based, at least in part, on the determined degree that the first deadlock state was prevented during the first performance test.

DETAILED DESCRIPTION

Deadlock can cause severe problems for end users. A software system in deadlock usually stops responding to client requests, which can directly cause customer dissatisfaction. In addition, a deadlock in one software component can cause other related components to wait and thereby lead to a chain reaction of waiting. Therefore, detecting and diagnosing deadlocks is usually non-trivial in software deployed for a production run. In complex execution environments, there is often no good way to determine whether a system is deadlocked or just running very slowly. Given the many components interacting with each other in complex execution environments, even if a determination is made that the system is deadlocked the identification of the root cause may still be very difficult.

Servers in which Java™ applications are hosted, commonly referred to as "Java application servers" (or simply "application servers"), may provide run-time services to a myriad of Java™ applications. The hosted applications may service requests for a large number of concurrent requesters, which can include other programs as well as human users. The performance requirements placed on application servers by a given deploying enterprise or its end users are typically quite demanding. As the Java™ applications and deployment scenarios become increasingly complex, performance requirements tend to increase as well.

A feature of the Java™ Platform is the support for multithreading at the language level. At any given time, a program can have several threads running concurrently, each thread performing a different job. The Java™ language accomplishes such tasks by synchronization, which coordinates activities and data access among multiple threads. The Java™ Virtual Machine (JVM) uses mechanisms named monitors to support synchronization. There is a lock associated with every object or resource in Java™. If multiple threads need to operate on the same object then a monitor is often used to provide a way for the threads to independently work on the object without interfering with each other.

When threads in a process share and update the same data, their activities must be synchronized to avoid errors. In Java™, this is accomplished using a synchronized keyword, or with wait and notify commands. Synchronization by the JVM is achieved through the use of locks, each of which is associated with an object. For a thread to work on an object, the thread must have control over the lock associated with the object, the thread must "hold" the lock. Only one thread can hold a lock at a time. If a new thread tries to take a lock that is already held by another thread, then the new thread must wait until the lock is released. Once the lock for the object is obtained by performing a lock operation in the JVM, the body of the code segment can be executed. In other words, the thread becomes the owner of the object and hence, an active thread.

Sometimes when a program executes concurrent thread operations, a deadlock situation may occur. A deadlock occurs when one thread, for example thread 1, owns resource A and wants to acquire resource B, which is owned by thread 2. In order for thread 1 to access resource B, thread 1 has to wait until thread 2 releases the monitor for resource B. However, if thread 2 is waiting for thread 1 to release the monitor for resource A before thread 2 releases the monitor for resource B, then thread 2 also becomes "stuck" in a wait state. This creates a situation where neither thread can proceed. Furthermore, if more than two threads are involved in the similar manner, a circular wait condition occurs as each thread holds the resources that other threads want in a cycle. There is also another situation wherein a thread can be waiting on the resources that the thread itself currently owns. This introduces an infinite wait condition since the thread continues to wait for itself.

If a second thread wants to claim ownership of the monitor during the time of execution of an active thread, then the second thread must wait in the entry set of the object along with any other threads that are already waiting for the monitor. Once the active thread is finished executing the critical region, the active thread can release the monitor using one of two methods. First, the active thread can complete the execution and then simply exit the monitor. Alternatively, the active thread can issue a wait command. By issuing the wait command, the active thread becomes a waiting thread in the wait set. If the former owner of a given monitor did not issue a notify command before releasing the monitor, then only threads included in the entry set compete to acquire the monitor. However, if the former owner did execute a notify command, then the entry set along with any threads in the wait set compete to acquire the monitor. If a thread in the wait state "wins", then that thread exits the wait set and acquires the monitor, thereby becoming an active thread.

The performance of a Java™ application can suffer if the application executes one or more types of "waits". For example, applications often need to access a limited resource, such as connecting to a database to retrieve or store data. The number of available connections to a database is often restricted to a configured maximum, and thus, some of the concurrently executing threads may have to wait until a database connection becomes available. In a web-centric environment, the incoming requests to an application server may be very homogeneous, such that many requests attempt to exercise the same or similar execution paths. Thus, blockages, loosely defined as a large number of waiting threads, on commonly-needed critical resources may occur relatively often. Typically, blockages can have an adverse effect on many programs and users. Thus, contention for a limited resource frequently becomes a major source of bottlenecks in application servers.

Generally, whenever an application is forced to wait, performance suffers. In many cases, the applications can make use of various types of synchronization that is facilitated by, for example, Java™ monitors. Synchronization can be used to protect shared resources (e.g., by serializing access to a resource) or to enforce an ordering of execution. For example, an ordering of execution can be enforced by using event handling, where one thread waits for another thread to signal, or notify, that the thread has reached a particular point. Ordering of execution is particularly common for synchronizing operation among producer threads and consumer threads. However, synchronization generally reduces concurrency, and if the applications executing on a particular application server are encountering a large number of waits and/or are waiting for relatively long periods of time, performance is degraded.

Although it is possible to develop deadlock-free code, it is quite challenging to do so in practice. For example, applying a set of strict coding rules for avoiding deadlocks may cause other complexities and inefficiencies in the design and may not be favorable in many situations. In addition, a large number of developers in different teams must all follow the coding rules to make them effective. Furthermore, when third party libraries are involved, allowing some exceptions to the coding rules may be the only option when developing a program, thereby adding additional complexity to the process of identifying the source of a given deadlock.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Exemplary embodiments of the present invention will now be described in detail with reference to the Figures. For the purpose of simplifying the disclosure, disclosed exemplary embodiments have, in general, been configured for use with a Java™ based program. However, this is not to be interpreted as a limitation to Java™ based programs as other exemplary embodiments can be configured for use with other computer programming languages.

Figure 1:
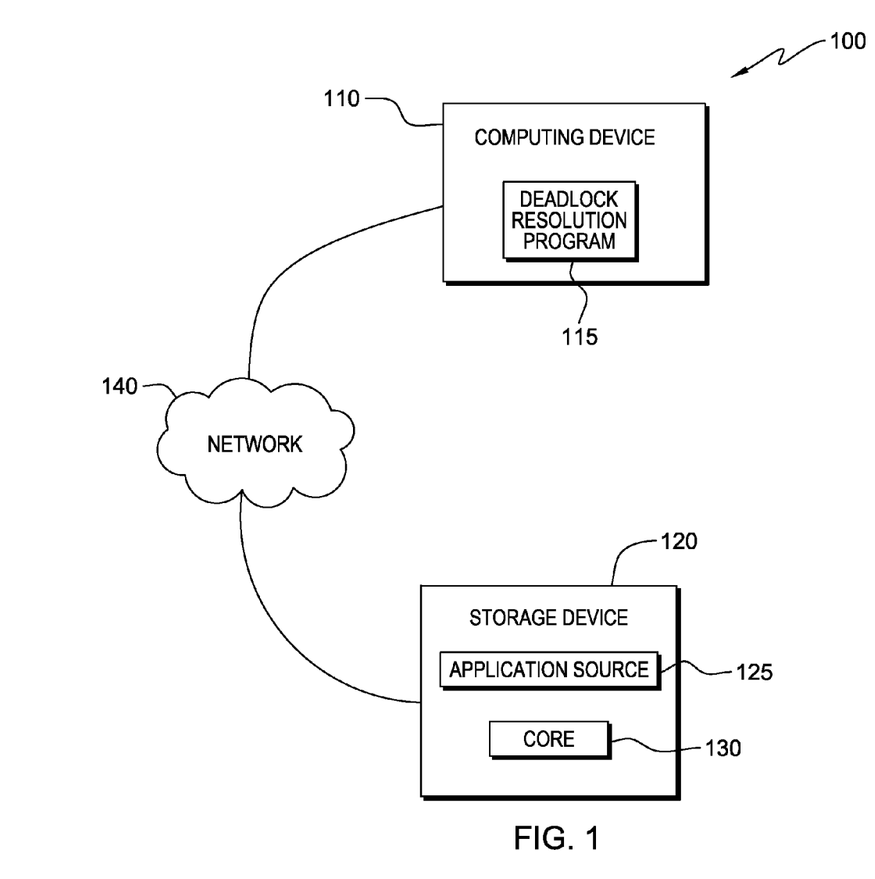
FIG. 1 is a functional block diagram illustrating a program testing environment, in accordance with an exemplary embodiment.

FIG. 1 is a functional block diagram illustrating a program testing environment, generally designated 100, in accordance with one embodiment of the present invention. Program testing environment 100 includes computing device 110 and storage device 120 connected over network 140. Computing device 110 includes deadlock resolution program 115. Storage device 120 includes application source 125, and core 130.

In alternative embodiments, deadlock resolution program 115 can be stored externally to computing device 110 and accessed through network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that support communications between computing device 110 and storage device 120 in accordance with an exemplary embodiment of the present invention.

In various embodiments of the present invention, computing device 110 is a computing device that can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to deadlock resolution program 115, application source 125, and core 130, and is capable of running deadlock resolution program 115. Computing device 110 may include internal and external hardware components, as depicted and described in further detail with respect to FIG. 3.

In various embodiments of the present invention, storage device 120 is a data storage device in communication with computing device 110. In general, storage device 120 is a data storage device used to store data, such as the data included in application source 125, and core 130. Typically, the data included in application source 125, and core 130 is accessed as needed by computing device 110 via network 140. In some embodiments, storage device 120 is integral with computing device 110.

In general, in exemplary embodiments, deadlock resolution program 115 substantially mimics an initial deadlock scenario that was experienced by a program (also called an application) and uses application state data and additional code to aid in the resolution of the deadlock. Typically, deadlock resolution program 115 utilizes original Java™ core data that was taken at a time when a program, under test conditions, experienced a deadlock scenario. Deadlock resolution program 115 inserts byte code hooks into the methods included in the program source code. In general, a byte code hook herein refers to any additional code that changes the lock timing or hold timing of a method, but can, in some embodiments, include any additional code that is inserted into the source code to alter thread activity. In short, a byte code hook alters one or both of a lock hold time for one or more threads of the program and/or a wait time for one or more threads of the program. Typically, the byte code hooks are inserted dynamically into the source code of the program during runtime of a performance test of the program. In other embodiments, a new version of the source code is created containing the byte code hooks.

In exemplary embodiments, deadlock resolution program 115 re-runs the program, with the byte code hooks inserted, under the test conditions to identify the data being processed and locks being accrued within the scope defined in the Java™ core data, e.g., the Java™ core stacks. By re-running the program under the test conditions deadlock resolution program 115 more accurately reproduces the original deadlock scenario by monitoring the state of the threads in question, i.e., the threads that may have caused the initial deadlock. The data generated by deadlock resolution program 115 also allows users, such as software engineers, developing the program to better ascertain whether or not code updates, also called patches, have resolved the problem that resulted in the original deadlock scenario. Therefore, by using an exemplary embodiment of deadlock resolution program 115, a user may correct a program bug by patching the program only once or twice, which can save both time and money during program development.

In exemplary embodiments, application source 125 is a stored copy of the source code for a given program being tested. Application source 125 can, in some embodiments, include versions of the source code with byte code hooks inserted by deadlock resolution program 115 as well as versions of the source code that have been updated in response to testing results.

In exemplary embodiments, core 130 includes Java™ core data produced at a time when the program, under test conditions, experienced a deadlock scenario. The types of data stored in core 130 are not restricted to only Java™ core data. In general, core 130 includes data such as the thread state data, program/application state data, and thread stack data of a given program under test. Core 130 also includes the results of program testing by deadlock resolution program 115 and can, in some embodiments, include other types of data, for example, program patches and the number of testing cycles completed.

Figure 2:
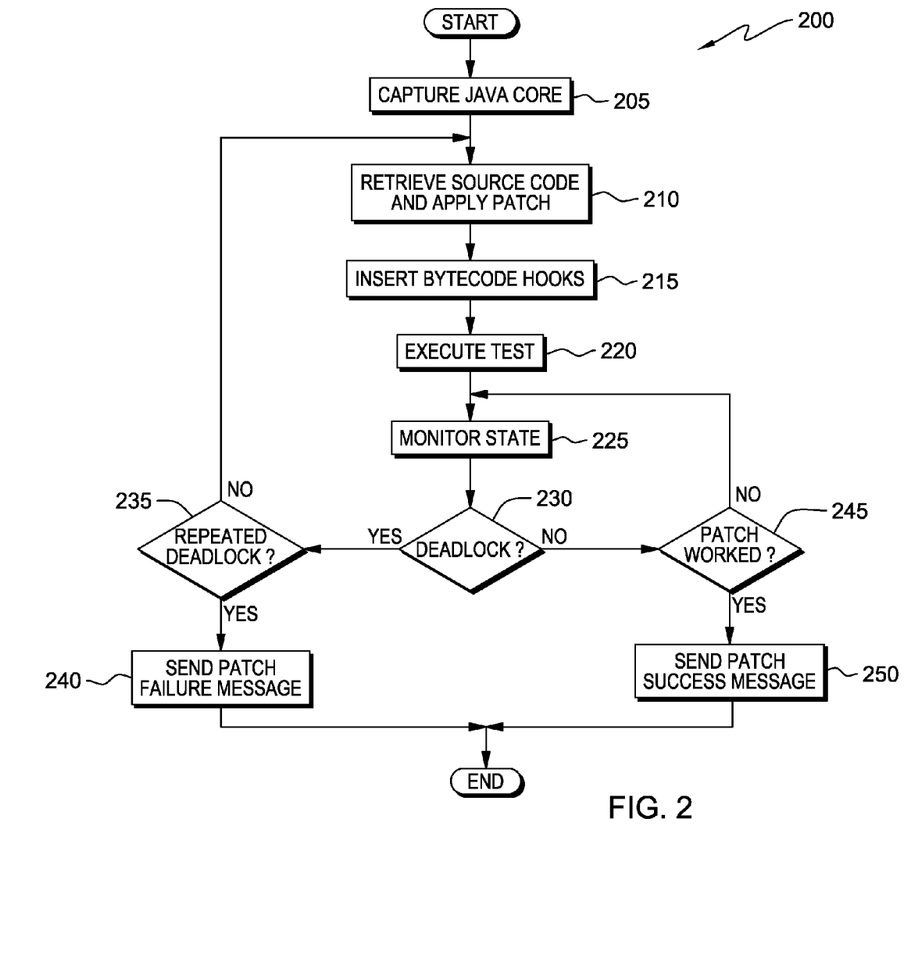
FIG. 2 illustrates operational steps of a deadlock resolution program, on a computing device within the program testing environment of FIG. 1, in accordance with an exemplary embodiment.

FIG. 2 illustrates the operational steps utilized by deadlock resolution program 115 to resolve a deadlock scenario experienced by a given program included in application source 125, in accordance with an exemplary embodiment.

In an exemplary embodiment, deadlock resolution program 115 captures a Java™ core of a program under test that experiences a deadlock state and stores it as part of core 130, in step 205. The Java™ core is, in general, a snapshot of all the threads that existed at the time of the deadlock. Knowing the exact state of each thread is useful since the timing of various threads are often the root cause leading to deadlock. Using the Java™ core data, now included in core 130, deadlock resolution program 115 identifies each thread as well as the locks associated with each thread.

In an exemplary embodiment, deadlock resolution program 115 retrieves the source code, included in application source 125, of the program under test and applies a patch to the source code, in step 210. In general, the goal of applying the patch is to correct for the error that lead to the deadlock. Typically, the patch is included in application source 125. In certain embodiments, the patch can be added to the source code by a user, e.g., the user manually adds the lines of code to the source code, or retrieved from another source, such as a storage device, and then added to the source code. In some embodiments, prior to the first patch being applied, an original deadlock state is reproduced by adding byte code hooks to the source code (using thread stack information such as Java™ core data), thereby extending the lock periods to better ensure the original deadlock state can be reproduced prior to the testing of the patch.

In step 215, of an exemplary embodiment, deadlock resolution program 115 modifies the source code of the program under test by inserting byte code hooks (i.e., additional code) into the source code of the program. The byte codes are inserted according to the data included in the Java™ core (e.g., thread state data), thereby mimicking the state of the threads at the time of deadlock. Thus, when the program under test is run again, the state that caused the deadlock should be substantially recreated. In some embodiments, the byte code hooks are added dynamically during runtime of the program, such as during the test conditions of step 220. In other embodiments, a copy of the source code is created with the bytes codes inserted and saved as part of application source 125.

In step 220, of an exemplary embodiment, deadlock resolution program 115 executes the patched and modified program under the same test conditions that created the deadlock. Deadlock resolution program 115 monitors the state of the threads of the program for any sign of deadlock, in step 225. For example, deadlock resolution program 115 monitors the lock time and execution time of various threads. If a particular thread does not execute within a specified time period deadlock resolution program 115 determines that a deadlock has occurred. In another example, deadlock resolution program 115 monitors the overall execution rate of threads and determines a deadlock has occurred if the rate of thread execution falls below a certain threshold.

In an exemplary embodiment, if a deadlock occurs (decision step 230, yes branch), then deadlock resolution program 115 determines if there have been repeated instances of deadlock resulting from the test, in decision step 235. If there have been repeated instances of deadlock resulting from the test (decision step 235, yes branch), then deadlock resolution program 115 sends a message indicating that the patch has failed to correct the problem causing the deadlock, in step 240. For example, a test includes several cycles of testing and a deadlock was determined, by deadlock resolution program 115, to have occurred in 5 out of seven cycles. The large number of deadlocks, identified by deadlock resolution program 115, indicates that the patch may not have addressed the root cause of the initial deadlock. In another example, two cycles of source code patching and testing have been applied to a program. However, the program is still exhibiting deadlock under testing conditions. As in the above example, the number of deadlocks identified by deadlock resolution program 115 indicates that the patch may not have addressed the root cause of the initial deadlock.

In an exemplary embodiment, if there have not been repeated instances of deadlock resulting from the test (decision step 235, no branch), then deadlock resolution program 115 returns to step 210. For example, after ten testing cycles, deadlock resolution program 115 is unable to identify a second instance of deadlock. In response, deadlock resolution program 115 determines that there are not repeated instances of deadlock and returns to step 210. In general, a single instance of deadlock occurring during a number of cycles of testing indicates that an applied patch has worked at least in part. A user, e.g., a software engineer, can use this information to isolate the remaining source code that is causing the deadlock and to refine future patching attempts. In general, the number of deadlocks, e.g., test failures, required to initiate step 240 is a predetermined value. However, in certain embodiments, the number of failures required to initiate step 240 is set by a user.

In some embodiments the degree of deadlock prevention is included in the message indicating that a patch failed to resolve the deadlock. For example, an initial patch yields five instances of deadlocks and a subsequent patch yields a single instance of deadlock. The reduction in the number of deadlocks is included in the message indicating failure of the second patch. Using this data, a software engineer is able to identify the code that was overlooked in previous patches and makes the required corrections to prevent future deadlock.

In an exemplary embodiment, if a deadlock does not occur (decision step 230, no branch), then deadlock resolution program 115 determines if a threshold amount of testing has been completed to confirm that the patch worked, in decision step 245. In general, the threshold amount of testing needed to determine that a patch works is a predetermined value. However, in certain embodiments, the threshold amount of testing required is set by a user.

In an exemplary embodiment, if the threshold amount of testing has not been reached (decision step 245, no branch) then deadlock resolution program 115 returns to step 225 and continues to monitor the state of the threads of the program for any sign of deadlock. If the threshold amount of testing has been reached (decision step 245, yes branch), then deadlock resolution program 115 sends a message indicating that the patch was successful, in step 250.

Figure 3:
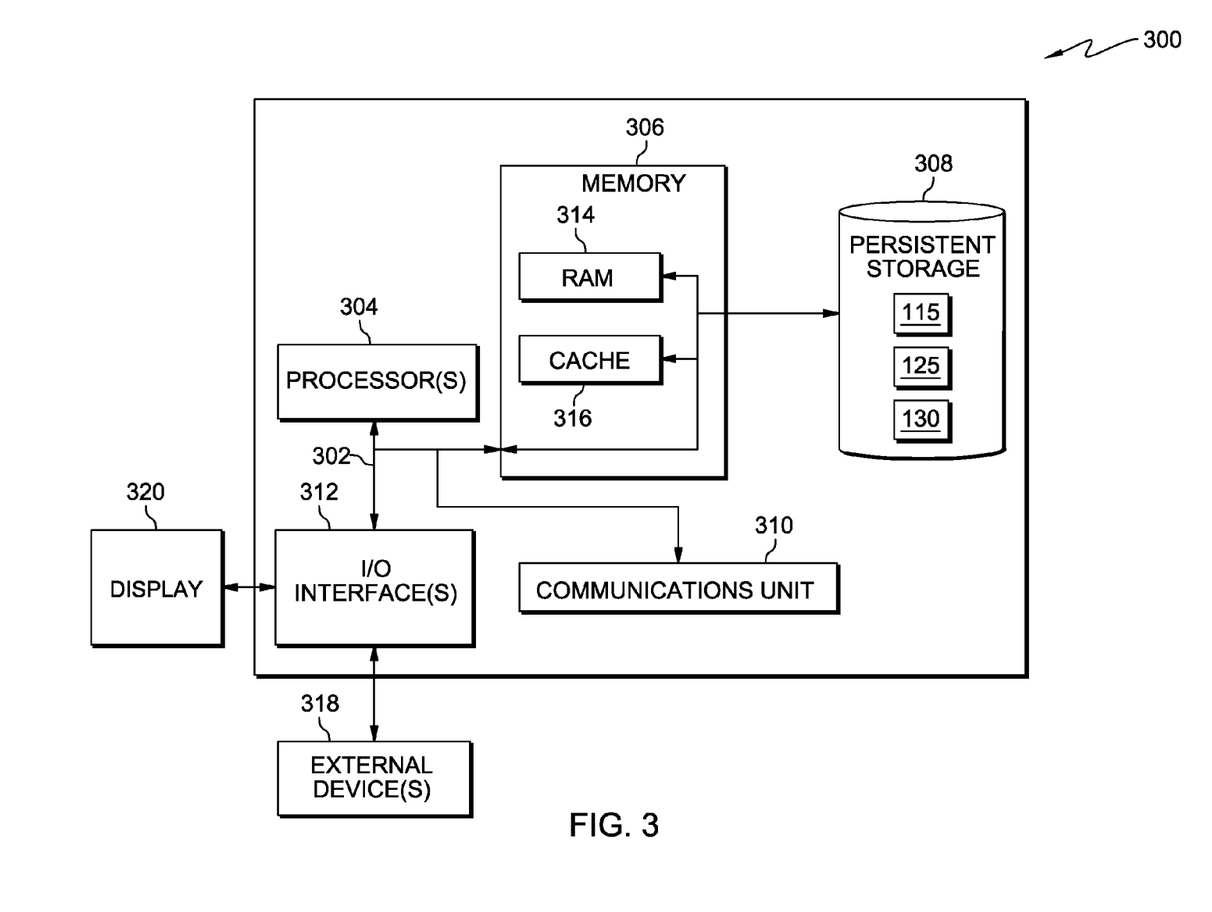
FIG. 3 depicts a block diagram of components of the storage device, and the computing device executing the deadlock resolution program, within the program testing environment of FIG. 1, in accordance with an exemplary embodiment.

FIG. 3 depicts a block diagram, 300, of the components of computing device 110 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Deadlock resolution program 115, application source 125, and core 130 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of storage device 120. In these examples, communications unit 310 includes one or more network interface cards. Communications unit 310 may provide communications through the use of either or both physical and wireless communications links. Deadlock resolution program 115, application source 125, and core 130 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., deadlock resolution program 115, application source 125, and core 130, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the program for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of using program state data and additional code to resolve deadlocks, the method comprising:
   the computer capturing a thread state data of a first program that experienced a first deadlock state, wherein the thread state data of the first program is generated by executing a first performance test using the first program, wherein the first performance test generates the first deadlock state;
   the computer generating a second program by applying a first program patch to the first program, wherein the first program patch is configured to reduce occurrence of the first deadlock state; and
   the computer determining whether the first program patch reduced an occurrence of the first deadlock state during a second performance test by:
     the computer inserting additional code into a source code of the second program to resolve, at least in part, the first deadlock state identified by the first performance test, wherein the inserted additional code alters one or both of a lock hold time for one or more threads of the second program and a wait time for one or more threads of the program;
     the computer executing a second performance test using the second program with the inserted additional code;
     the computer monitoring a first status of the second program with the inserted additional code that are under the second performance test;
     the computer determining an amount of reduction in the occurrence of the first deadlock state during the second performance test; and the computer generating a first message based, at least in part, on the amount of reduction in the occurrence of the first deadlock state during the second performance test.

2. The method of claim 1, wherein the step of the computer inserting additional code into the source code of the second program further includes:
the computer receiving the additional code; and
the computer inserting the additional code into the source code of the second program to substantially mimic the first deadlock state that generated the thread state data of the first program.

3. The method of claim 1, wherein the step of the computer determining whether the first program patch reduced an occurrence of the first deadlock state during the second performance test includes the steps of:
the computer determining whether a threshold number of testing cycles have been completed during the second performance test;
the computer determining whether the first deadlock state has occurred during the second performance test based, at least in part, on whether the first deadlock state occurred in one or more testing cycles completed during the second performance test; and
responsive to the determination that the first deadlock state has not occurred during the second performance test, the computer determining that the first patch prevented the first deadlock state.

4. The method of claim 1, wherein the step of the computer determining whether the first program patch reduced an occurrence of the first deadlock state during the second performance test includes the steps of:
the computer determining whether a threshold number of testing cycles have been completed during the second performance test;
the computer determining whether the first deadlock state has occurred during the second performance test based, at least in part, on whether the first deadlock state occurred in one or more testing cycles completed during the second performance test;
responsive to a determination that the first deadlock state has occurred during the second performance test, the computer determining that the first patch failed to prevent the first deadlock state;
responsive to a determination that the first program patch did not prevent the first deadlock state, generating, by the computer, a third program by applying a second program patch to the second program;
the computer inserting additional code into the source code of the third program;
the computer executing a third performance test using the third program and the inserted additional code;
the computer monitoring a second state of the third program and inserted additional code that are under the third performance test;
the computer determining whether the second program patch reduced occurrence of the first deadlock state during the third performance test; and
the computer generating a second message based, at least in part, on an amount of reduction in the occurrence of the first deadlock state during the third performance test.

5. The method of claim 4, wherein the step of the computer determining whether the second program patch reduced occurrence of the first deadlock state during the third performance test includes:
the computer determining whether a threshold number of testing cycles have been completed during the third performance test;
the computer determining whether the first deadlock state has occurred during the third performance test based, at least in part, on whether the first deadlock state occurred in one or more testing cycles completed during the third performance test; and
responsive to a determination that the first deadlock state has not occurred during the third performance test, the computer determining that the second patch prevented the first deadlock state.

6. A computer program product for using program state data and additional code to resolve deadlocks, the computer program product comprising:
one or more computer-readable storage media and program instructions stored on the one or more computer-readable storage media, the program instructions comprising:
program instructions to capture a thread state data of a first program that experienced a first deadlock state, wherein the thread state data of the first program is generated by executing a first performance test using the first program, wherein the first performance test generates the first deadlock state;
program instructions to generate a second program by applying a first program patch to the first program, wherein the first program patch is configured to reduce occurrence of the first deadlock state; and
program instructions to determine whether the first program patch reduced an occurrence of the first deadlock state during a second performance test by:
inserting additional code into a source code of the second program to resolve, at least in part, the first deadlock state identified by the first performance test, wherein the inserted additional code alters one or both of a lock hold time for one or more threads of the program and a wait time for one or more threads of the second program;
executing a second performance test using the second program with the inserted additional code;
monitoring a first status of the second program with the inserted additional code that are under the second performance test;
determining an amount of reduction in the occurrence of the first deadlock state during the second performance test; and
program instructions to generate a first message based, at least in part, on the amount of reduction in the occurrence of the first deadlock state during the second performance test.

7. The computer program product of claim 6, wherein the program instructions to insert additional code into the source code of the second program further include:
program instructions to receive the additional code; and
program instructions to insert the additional code into the source code of the second program to substantially mimic the first deadlock state that generated the thread state data of the first program.

8. The computer program product of claim 6, wherein the program instructions to determine whether the first program patch reduced an occurrence of the first deadlock state during the second performance test include:
program instructions to determine whether a threshold number of testing cycles have been completed during the second performance test;

program instructions to determine whether the first deadlock state has occurred during the second performance test based, at least in part, on whether the first deadlock state occurred in one or more testing cycles completed during the second performance test; and program instructions to respond to a determination that the first deadlock state has not occurred during the second performance test by determining that the first patch prevented the first deadlock state.

9. The computer program product of claim 6, wherein the program instructions to determine whether the first program patch reduced an occurrence of the first deadlock state during the second performance test include:

program instructions to determine whether a threshold number of testing cycles have been completed during the second performance test;

program instructions to determine whether the first deadlock state has occurred during the second performance test based, at least in part, on whether the first deadlock state occurred in one or more testing cycles completed during the second performance test;

program instructions to respond to a determination that the first deadlock state has occurred during the second performance test by determining that the first patch failed to prevent the first deadlock state;

program instructions to respond to a determination that the first program patch did not prevent the first deadlock state by generating a third program by applying a second program patch to the second program;

program instructions to insert additional code into the source code of the third program;

program instructions to execute a third performance test using the third program and the inserted additional code;

program instructions to monitor a second state of the third program and inserted additional code that are under the third performance test;

program instructions to determine whether the second program patch reduced occurrence of the first deadlock state during the third performance test; and program instructions to generate a second message based, at least in part, on an amount of reduction in the occurrence of the first deadlock state during the third performance test.

10. The computer program product of claim 9, wherein the program instructions to determine whether the second program patch reduced occurrence of the first deadlock state during the third performance test include:

program instructions to determine whether a threshold number of testing cycles have been completed during the third performance test;

program instructions to determine whether the first deadlock state has occurred during the third performance test based, at least in part, on whether the first deadlock state occurred in one or more testing cycles completed during the third performance test; and program instructions to respond to a determination that the first deadlock state has not occurred during the third performance test by determining that the second patch prevented the first deadlock state.

11. A computer system for using program state data and additional code to resolve deadlocks, the computer system comprising:

one or more computer processors;
one or more computer readable storage medium;
program instructions stored on the computer readable storage medium for execution by at least one of the one or more processors, the program instructions comprising:

program instructions to capture a thread state data of a first program that experienced a first deadlock state, wherein the thread state data of the first program is generated by executing a first performance test using the first program, wherein the first performance test generates the first deadlock state;

program instructions to generate a second program by applying a first program patch to the first program, wherein the first program patch is configured to reduce occurrence of the first deadlock state; and program instructions to determine whether the first program patch reduced an occurrence of the first deadlock state during a second performance test by:

inserting additional code into a source code of the second program to resolve, at least in part, the first deadlock state identified by the first performance test, wherein the inserted additional code alters one or both of a lock hold time for one or more threads of the program and a wait time for one or more threads of the second program;

executing a second performance test using the second program with the inserted additional code;

monitoring a first status of the second program with the inserted additional code that are under the second performance test;

determining an amount of reduction in the occurrence of the first deadlock state during the second performance test; and program instructions to generate a first message based, at least in part, on the amount of reduction in the occurrence of the first deadlock state during the second performance test.

12. The computer system of claim 11, wherein the program instructions to insert additional code into the source code of the second program further includes:

program instructions to receive the additional code; and
program instructions to insert the additional code into the source code of the second program to substantially mimic the first deadlock state that generated the thread state data of the first program.

13. The computer system of claim 11, wherein the program instructions to determine whether the first program patch reduced an occurrence of the first deadlock state during second performance test include:

program instructions to determine whether a threshold number of testing cycles have been completed during the second performance test;

program instructions to determine whether the first deadlock state has occurred during the second performance test based, at least in part, on whether the first deadlock state occurred in one or more testing cycles completed during the second performance test; and program instructions to respond to a determination that the first deadlock state has not occurred during the second performance test by determining that the first patch prevented the first deadlock state.

14. The computer system of claim 11, wherein the program instructions to determine whether the first program patch reduced an occurrence of the first deadlock state during second performance test include:

program instructions to determine whether a threshold number of testing cycles have been completed during the second performance test;

program instructions to determine whether the first deadlock state has occurred during the second performance test based, at least in part, on whether the first deadlock state occurred in one or more testing cycles completed during the second performance test;

program instructions to respond to a determination that the first deadlock state has occurred during the second performance test by determining that the first patch failed to prevent the first deadlock state;

program instructions to respond to a determination that the first program patch did not prevent the first deadlock state by generating a third program by applying a second program patch to the second program;

program instructions to insert additional code into the source code of the third program;

program instructions to execute a third performance test using the third program and the inserted additional code;

program instructions to monitor a second state of the third program and inserted additional code that are under the third performance test;

program instructions to determine whether the second program patch reduced occurrence of the first deadlock state during the third performance test; and program instructions to generate a second message based, at least in part, on an amount of reduction in the occurrence of the first deadlock state during the third performance test.

15. The computer system of claim 11, wherein the program instructions to determine whether the second program patch reduced occurrence of the first deadlock state during third performance test include:

program instructions to determine whether a threshold number of testing cycles have been completed during the third performance test;

program instructions to determine whether the first deadlock state has occurred during the third performance test based, at least in part, on whether the first deadlock state occurred in one or more testing cycles completed during the third performance test; and program instructions to respond to a determination that the first deadlock state has not occurred during the third performance test by determining that the second patch prevented the first deadlock state.

* * * * *